United States Patent
Shinkai et al.

(10) Patent No.: US 8,011,352 B2
(45) Date of Patent: Sep. 6, 2011

(54) GAS INTRODUCING STRUCTURE OF INTAKE PATH

(75) Inventors: Fumihiro Shinkai, Chiryu (JP); Koichi Maruyama, Kariya (JP); Toshihiro Kawai, Toyota (JP); Kiyoshi Naiki, Obu (JP); Takanori Kawazu, Toyota (JP); Takeshi Murakami, Toyota (JP); Takashi Tsukiyama, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 220 days.

(21) Appl. No.: 12/379,915

(22) Filed: Mar. 4, 2009

(65) Prior Publication Data

US 2009/0223476 A1 Sep. 10, 2009

(30) Foreign Application Priority Data

Mar. 5, 2008 (JP) .................................. 2008-055262

(51) Int. Cl.
*F02B 47/08* (2006.01)
*F02B 47/00* (2006.01)

(52) U.S. Cl. ................................. 123/568.17

(58) Field of Classification Search ............ 123/568.17, 123/568.11, 184.38, 184.42, 184.53, 590; 60/605.1, 605.2, 278, 280; 701/108
See application file for complete search history.

(56) References Cited

U.S. PATENT DOCUMENTS

| 4,648,373 A | * | 3/1987 | Noguchi et al. | ......... 123/568.17 |
| 4,672,939 A | * | 6/1987 | Yokoi et al. | ............. 123/568.17 |
| 6,138,651 A | | 10/2000 | Mori et al. | |
| 2003/0111066 A1 | * | 6/2003 | Veinotte | ................... 123/568.18 |
| 2004/0079348 A1 | | 4/2004 | Mori et al. | |
| 2005/0005921 A1 | | 1/2005 | Ikeda et al. | |
| 2006/0060163 A1 | | 3/2006 | Vanderveen et al. | |

FOREIGN PATENT DOCUMENTS

| EP | 0 741 242 A1 | 11/1996 |
| EP | 1 128 057 A1 | 8/2001 |
| GB | 2 228 046 A | 8/1990 |
| JP | 7-247917 | 3/1994 |
| JP | 7-259656 | 3/1994 |

OTHER PUBLICATIONS

Partial European Search Report from EPO for Application No./Patent No. 09002893.7-1263/2098716, dated Jun. 22, 2011.

* cited by examiner

*Primary Examiner* — Mahmoud Gimie
(74) *Attorney, Agent, or Firm* — Stites & Harbison PLLC; Juan Carlos A. Marquez, Esq.

(57) ABSTRACT

A gas introducing structure of an intake path includes a gas introducing path introducing a gas into an intake airflow in the intake path of an internal combustion engine, wherein an inner peripheral surface of the gas introducing path is made of a bottom surface appearing as a straight line at a lower side of a perpendicular cross section of the inner peripheral surface and a curved wall surface appearing as a convex curved line, connecting with each end of the straight line at an angle, at an upper side of the perpendicular cross section of the inner peripheral surface.

19 Claims, 9 Drawing Sheets

GAS INTRODUCING STRUCTURE OF INTAKE PATH

CROSS REFERENCE TO RELATED APPLICATIONS

This application is based on and claims priority under 35 U.S.C §119 with respect to Japanese Patent Application 2008-055262, filed on Mar. 5, 2008, the entire content of which is incorporated herein by reference.

FIELD OF THE INVENTION

This invention relates to a gas introducing structure in which a gas is introduced from a gas introducing path into an intake airflow in an intake path of an internal combustion engine.

BACKGROUND

In an exhaust gas recirculation system, exhaust air is supplied to a surge tank or an intake branch pipe, thereby mixing the exhaust air with intake air (For example, refer to P.3 and FIGS. 2 and 3 of JP H7-259656A, P.3 and FIG. 5 of JP H7-247917A, and P.5 and FIG. 11 of JP H11-210560A). According to JP H7-259656A, exhaust air is introduced into intake air from circular and oval openings which open to a surge tank, thereby uniformly distributing the exhaust air to each cylinder.

According to JP H7-247917A, an exhaust gas recirculating path, guiding the exhaust air to an upstream of a swirl control valve, is formed to be an arcwise oval, thereby increasing the temperature in an intake port to facilitate fuel vaporization. According to JP H11-210560A, an oval shaped exhaust air intake port, which is elongated in a flow direction, is formed immediately below a throttle valve, thereby mixing intake air with exhaust air uniformly and preventing deposit adherence.

Water condensation may occur during exhaust air circulation due to cooling of vapor contained in the exhaust air. If the condensed water accumulates in an exhaust introducing path leading to intake air, the exhaust introducing path is blocked off. Consequently, the introduced exhaust airflow is not uniformly mixed with the intake air and tends to be intermittent. These phenomena increase difficulties in uniform diffusion of the exhaust air into the intake air and uniform distribution to each cylinder. As a result, the exhaust gas recirculation is not smoothly conducted. For this reason, it is necessary to discharge the condensed water smoothly from the exhaust introducing path by flowing the condensed water along a wall surface of the exhaust introducing path.

In JP H7-259656A, JP H7-247917A, and JP H11-210560A, condensed water, occurring by a time that the exhaust air is introduced into the intake air, is not considered, and measurements for drawbacks caused by the condensed water in the exhaust air introduction are not sufficiently made. Further, according to JP H7-259656A, JP H7-247917A, and JP H11-210560A, the exhaust introducing path opens to a wall surface of the intake path located around the throttle valve. However, in order to uniformly diffuse the exhaust air into the intake air without causing uneven exhaust airflow between the exhaust introducing path and the cylinders, the exhaust introducing path should open to a position so that the exhaust air is introduced in the intake airflow that has been divided for each cylinder. Moreover, the position should project into the intake airflow to some extent. However, when the exhaust introducing path opens in the position meeting the above-described conditions, the exhaust air tends to be subject to the effects of the intake pulsation. Thus, the uniform diffusion of the exhaust air into the intake air is hindered, and the uniform distribution of the exhaust air to each cylinder becomes difficult.

The same is true for other gases such as blow-by gas or a fuel vapor from a canister. A need exists for a gas introducing structure of an intake path which is not susceptible to the drawback mentioned above.

SUMMARY OF THE INVENTION

According to a first aspect of the present invention, a gas introducing structure of an intake path includes a gas introducing path introducing a gas into an intake airflow in the intake path of an internal combustion engine, wherein an inner peripheral surface of the gas introducing path includes or is defined by a bottom surface appearing as a straight line at a lower side of a perpendicular cross section of the inner peripheral surface and a curved wall surface appearing as a convex curved line, connecting with each end of the straight line at an angle, at an upper side of the perpendicular cross section of the inner peripheral surface.

According to a second aspect of the present invention, a gas introducing structure of an intake path includes a gas introducing path introducing a gas to an intake airflow in the intake path of an internal combustion engine, wherein an intake branch pipe of an intake manifold and an intake port formed at a cylinder head of the internal combustion engine are connected with each other at connecting end surfaces to form the intake path, wherein the gas introducing path is introduced into the intake branch pipe and an end of the gas introducing path, opening to the intake path, projects into the intake path and an end surface of the gas introducing path is formed in a manner that an intake path center side of the end surface inclines in a direction opposite to the intake airflow relative to the connecting end surface of the intake branch pipe.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

Figure 1A:
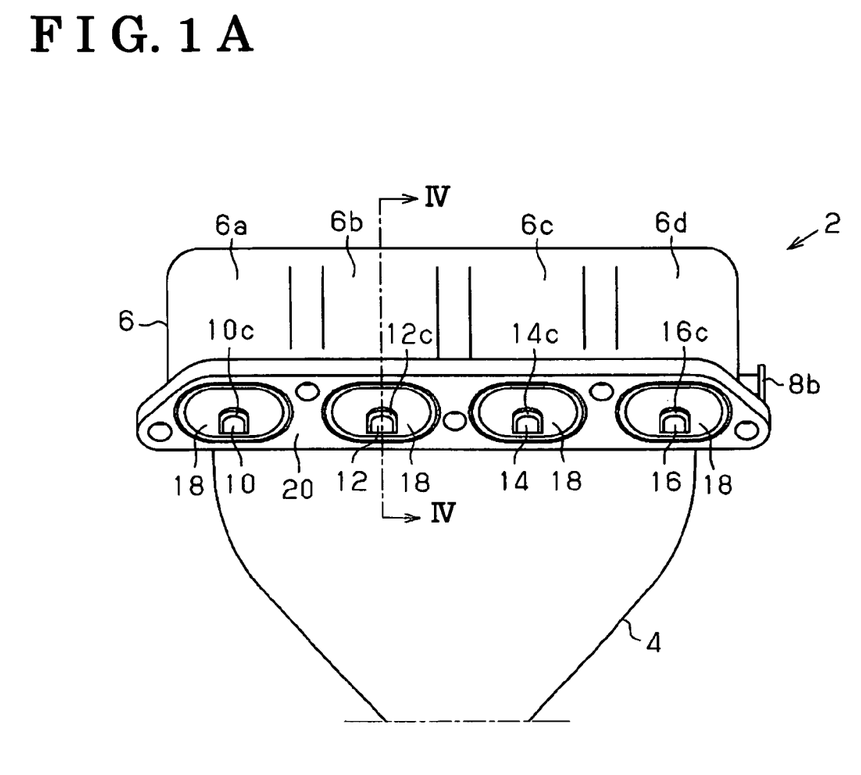
FIG. 1A is a front view of a main section of an intake manifold according to a first embodiment.
Figure 1B:
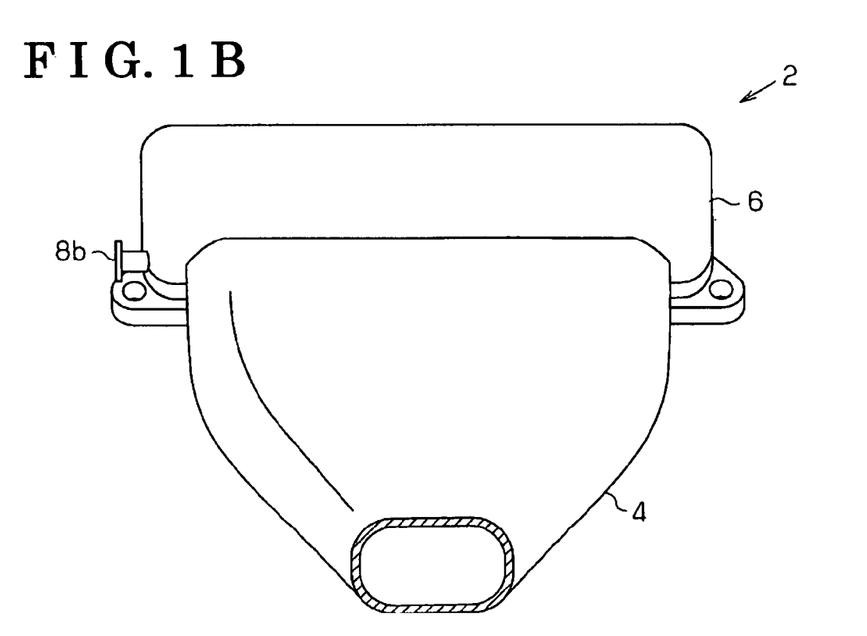
FIG. 1B is a back view of the main section of the intake manifold according to the first embodiment.
Figure 2A:
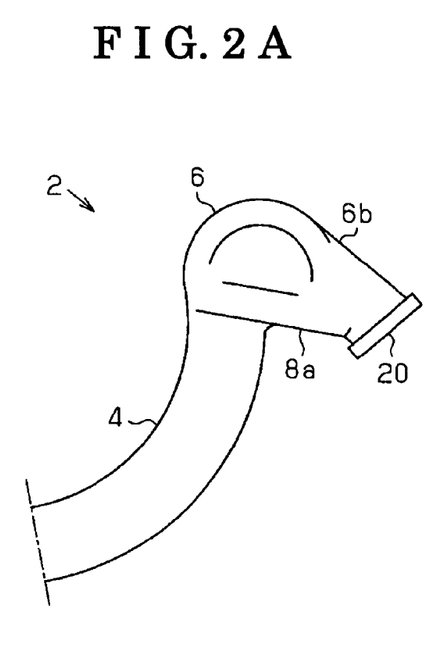
FIG. 2A is a side view showing one side of the main section of the intake manifold according to the first embodiment.
Figure 2B:
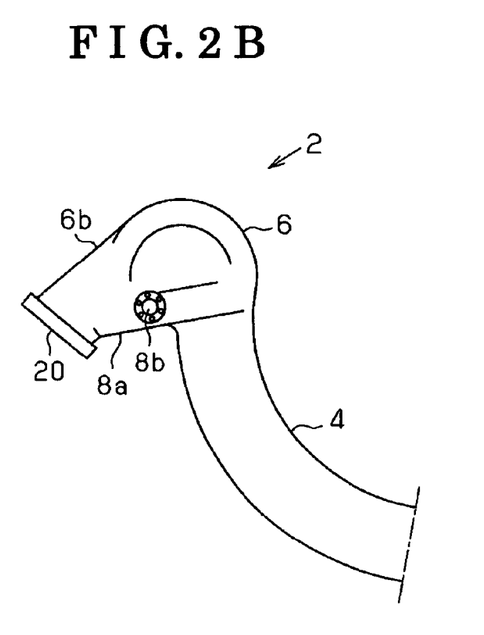
FIG. 2B is a side view showing the other side of the main section of the intake manifold according to the first embodiment.
Figure 3:
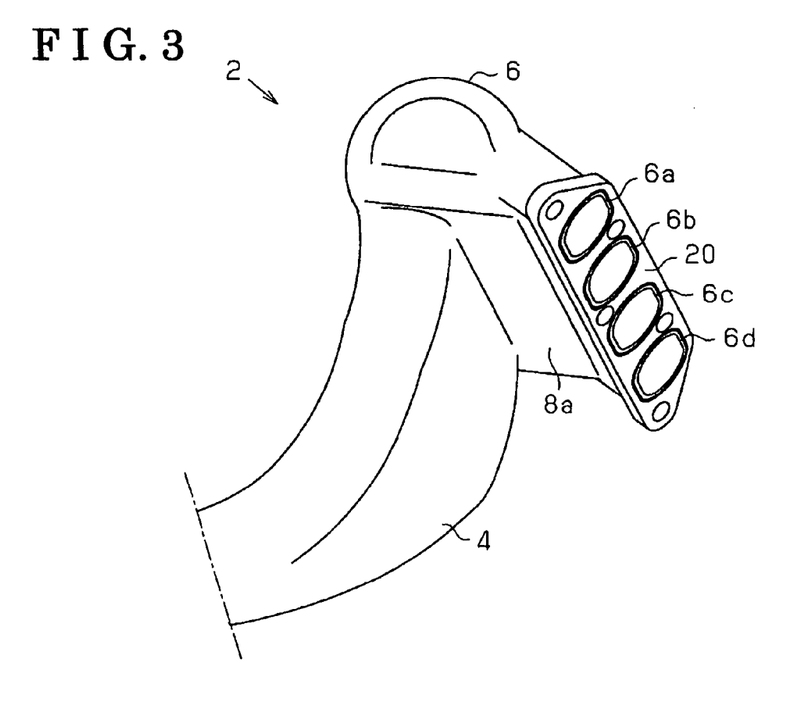
FIG. 3 is a perspective view of the main section of the intake manifold according to the first embodiment.
Figure 4:
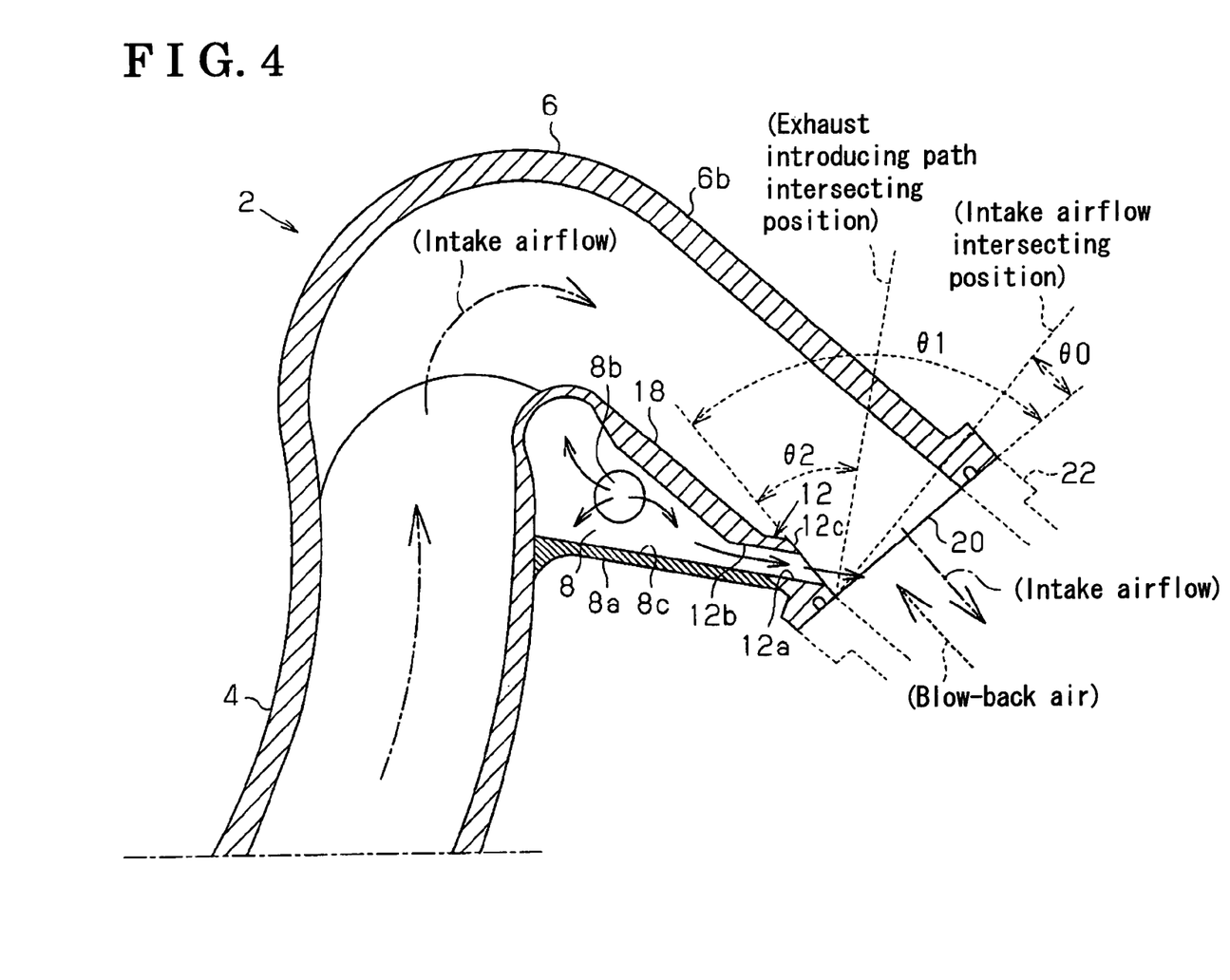
FIG. 4 is a cross sectional view along a line IV-IV of FIG. 1.

FIGS. 1 to 3 show main sections of an intake manifold 2, to which the invention is applied, in an internal combustion engine. FIG. 1A is a front view and FIG. 1B is a back view. FIG. 2A is a left side view, FIG. 2B is a right side view and FIG. 3 is a perspective view. FIG. 4 is a cross section taken along a line IV-IV in FIG. 1A.

The intake manifold 2 includes a common intake path 4 serving as a surge tank, and introduces intake air from a throttle valve via the common intake path 4. The intake manifold 2 further includes an intake branch pipe assembly 6 at a downstream of the common intake path 4. The common intake path 4 and the intake branch pipe assembly 6 are integrally molded with resin. In these figures, an overall shape of the intake manifold 2 is shown without providing a rib or the like for purposes of clarity. However, various kinds of reinforcing ribs, through holes for installing an intake air temperature sensor and the like, various kinds of engaging portions for supporting the intake manifold 2 may be provided at an outer peripheral surface of the intake manifold 2.

Here, a four cylinder engine is used as an internal combustion engine, and thus the intake branch pipe assembly 6 includes four intake branch pipes 6a, 6b, 6c and 6d. The internal combustion engine may have other numbers of cylinders. In this case, the intake manifold 2 has to have the same number of the intake branch pipes as the cylinders. Further, in case that the internal combustion engine, such as a V-type engine, includes multiple banks, the intake manifold 2 is provided for each bank, and each intake manifold 2 includes the number of intake branch pipes to match the number of cylinders provided in the bank.

As shown in FIG. 4, a resin made cover 8a is joined to an underside of the intake branch pipe assembly 6 by welding or fitting to form an EGR chamber 8 (common gas chamber) at a lower portion of the intake branch pipe assembly 6. Exhaust air is supplied to the EGR chamber 8 from an exhaust supply portion 8b via an EGR valve while conducting the exhaust gas recirculation. The exhaust supply portion 8b is formed at one side of the intake branch pipe assembly 6 and the EGR valve is provided at the EGR system. Exhaust introducing paths (gas introducing path) 10, 12, 14 and 16, corresponding to the intake branch pipes 6a, 6b, 6c and 6d, respectively extend in a straight line from the EGR chamber 8.

Figure 5A:
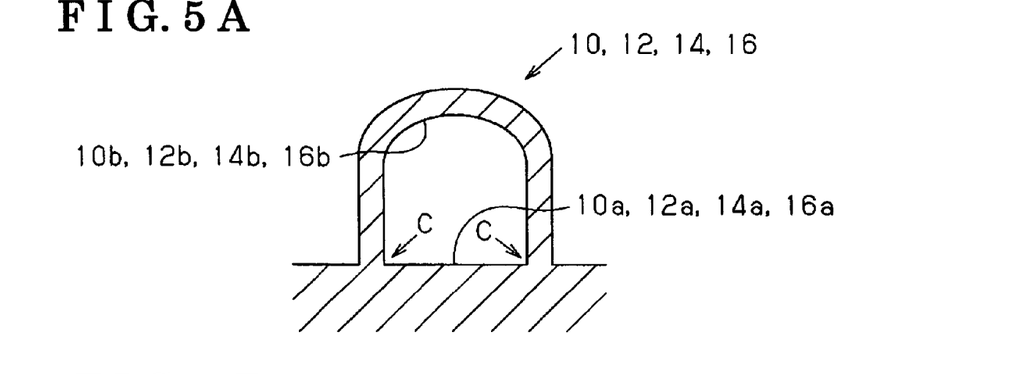
FIGS. 5A, 5B, 5C are cross sectional views of an exhaust introducing path in the intake manifold according to the first embodiment.

FIG. 5A is a longitudinal cross section of each exhaust introducing path 10, 12, 14, 16 taken along a line perpendicular to an axis of the exhaust introducing path. An inner peripheral surface of each exhaust introducing path 10, 12, 14, 16 is made of a bottom surface 10a, 12a, 14a, 16a and a curved wall surface 10b, 12b, 14b, 16b. Each bottom surface 10a, 12a, 14a, 16a is formed in substantially a horizontal straight line appearing at a lower side of a cross sectional surface which is taken along the line perpendicular to the axis of the exhaust introducing path 10, 12, 14, 16 (hereinafter, referred to as a perpendicular cross section surface). Each curved wall surface 10b, 12b, 14b, 16b is formed in a convex curved line appearing at an upper side of the perpendicular cross section surface and connects with both ends of the straight line (the bottom surface 10a, 12a, 14a, 16) having a certain angle, i.e. a substantially right angle.

When the intake manifold 2 is assembled to the internal combustion engine, the exhaust introducing paths 10 to 16 is in an inclined state that the exhaust air flows downward. Consequently, each flat bottom surface 10a, 12a, 14a, 16a inclines in the downward direction. Further, the cover 8a, forming the EGR chamber 8 by covering the intake branch pipe assembly 6 from the lower side, serves as a bottom plate, and the planar upper surface of the cover 8a, i.e. the bottom surface 8c of the EGR chamber, is formed continuously from the bottom surfaces 10a, 12a, 14a, 16a of the exhaust introducing paths 10, 12, 14, 16 in a same plane. Thus, the bottom surface 8c of the EGR chamber 8 inclines in the downward direction.

Each end surface 10c, 12c, 14c, 16c of the exhaust introducing path 10, 12, 14, 16 is not formed in the same plane as an inner peripheral surface 18 of each intake branch pipe 6a, 6b, 6c, 6d. A curved wall surface 10b, 12b, 14b, 16b side (an intake path center side) of the end surface 10c, 12c, 14c, 16c projects into the intake path of the intake branch pipe 6a, 6b, 6c, 6d. However, the curved wall surface 10b, 12b, 14b, 16b side inclines in a direction opposite to an intake airflow relative to a connecting end surface 20 of each intake branch pipe 6a, 6b, 6c, 6d. Here, the curved wall surface 10b, 12b, 14b, 16b side inclines at an angle θ1 from the connecting end surface 20.

In the first embodiment, the connecting end surface 20 of each intake branch pipe 6a, 6b, 6c, 6d, is formed so that an upper side of the connecting end surface 20 inclines in a direction of the intake airflow relative to a position that intersects an axis of the intake branch pipe 6a, 6b, 6c, 6d, at a right angle (hereinafter, referred to as an intake airflow intersecting position). For example, the upper side of the connecting end surface 20 inclines at an angle θ0 (=approximate 10 degrees). The curved wall surface 10b, 12b, 14b, 16b side of the end surface 10c, 12c, 14c, 16c of each exhaust introducing path 10, 12, 14, 16 inclines in the direction opposite to the intake airflow direction relative to the intake airflow intersecting position. Here, each end surface 10c, 12c, 14c, 16c is formed in a manner that the curved wall surface 10b, 12b, 14b, 16b side inclines at an angle θ2 (=approximate 45 to 55 degrees) in the direction opposite to the intake airflow relative to a position that intersects an axis of the exhaust introducing path 10, 12, 14, 16 at the right angle (hereinafter, referred to as an exhaust introducing path intersecting position).

When the intake manifold 2 is attached to an intake port 22 formed at a metallic cylinder head of the internal combustion engine and the EGR system functions, the exhaust air is introduced into the EGR chamber 8 from the exhaust supply portion 8b as indicated by an arrow. Then, the exhaust air is divided and flows into each exhaust introducing path 10, 12, 14, 16 to be distributed to the corresponding intake branch pipe 6a, 6b, 6c, 6d. As just described, the exhaust air is introduced into the intake air of the intake path for each cylinder and is mixed with the intake air to be supplied to each cylinder.

According to a first embodiment described above, the following effects will be achieved.

(1) The bottom surface 10a, 12a, 14a, 16a of each exhaust introducing path 10, 12, 14, 16 connects with the corresponding curved wall surface 10b, 12b, 14b, 16b at both ends thereof having a certain angle. Here, the bottom surface 10a, 12a, 14a, 16a connects with the corresponding curved wall surface 10b, 12b, 14b, 16b at substantially a right angle. This configuration allows corners C to be formed along the exhaust airflow direction in each exhaust introducing pipe 10, 12, 14, 16 as shown in FIG. 5A. When water vapor contained in the exhaust air flowing in each exhaust introducing path 10, 12, 14, 16 is condensed therein, the condensation tends to occur at the corners C or condensed water tends to gather at the corners C.

Figure 5B:
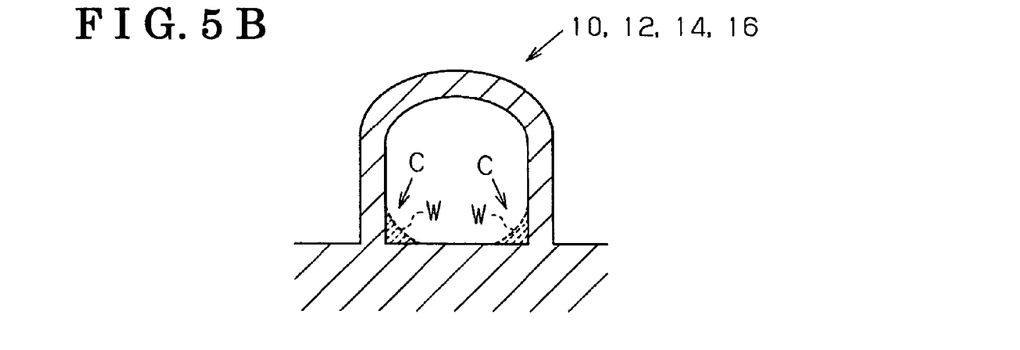

Accordingly, as shown in FIG. 5B, condensed water W occurs or gathers at the corners C of each exhaust introducing path 10, 12, 14, 16. Then, the condensed water W flows along the corners C in each exhaust introducing path 10, 12, 14, 16.

Figure 5C:
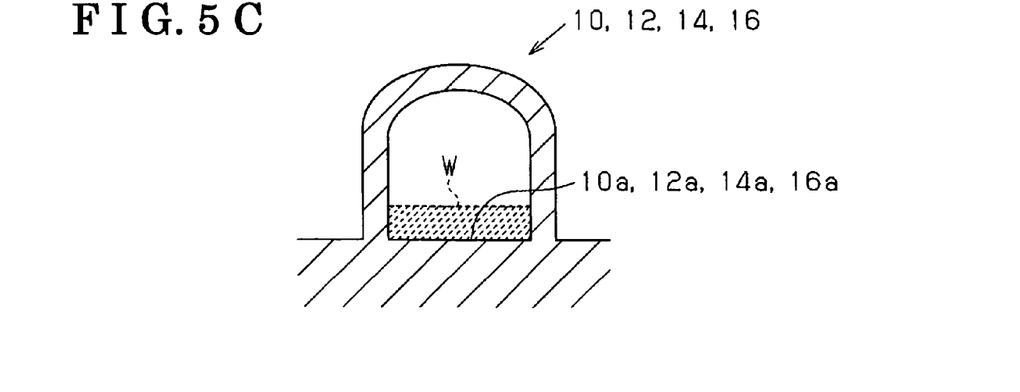

When the condensed water W occurs rapidly and the amount exceeds the amount that can be flowed along the corners C, the condensed water W flows out toward the bottom surface 10a, 12a, 14a, 16a, which lies adjacent to the corners C, as shown in FIG. 5C. Then, the condensed water W gathers at the bottom surface 10a, 12a, 14a, 16a and obtains high fluidity. Consequently, the condensed water W is easily moved and discharged from the exhaust introducing path 10, 12, 14, 16 due to the exhaust airflow flowing in the exhaust introducing path 10, 12, 14, 16 or the inclination of the exhaust introducing path 10, 12, 14, 16.

As described above, the condensed water flows out smoothly by flowing along the corners C or each bottom surface 10a, 12a, 14a, 16a without accumulating in the exhaust introducing path 10, 12, 14, 16. Thus, the condensed water does not hinder the exhaust air from being uniformly diffused into the intake air or from being uniformly distributed between cylinders. Hence, the exhaust introduction is smoothly conducted in the EGR system.

(2) Here, each exhaust introducing path 10, 12, 14, 16 is formed in a straight line and is disposed in the inclined state that the exhaust air flows downward. Accordingly, the configuration facilitates the flow of the condensed water in the exhaust flow direction to improve the efficiency of the discharge of the condensed water into the intake air.

Further, the bottom surface 10a, 12a, 14a, 16a of each exhaust introducing path 10, 12, 14, 16 is formed continuously from the bottom surface 8c of the EGR chamber 8 in the same plane. Thus, the condensed water flows out smoothly to each intake branch pipe 6a, 6b, 6c, 6d without accumulating between the EGR chamber 8 and the exhaust introducing path 10, 12, 14, 16.

(3) Each exhaust introducing path 10, 12, 14, 16 is introduced into the corresponding intake air branch 6a, 6b, 6c, 6d from a lower side, and the curved wall surface 10b, 12b, 14b, 16b side of the end of each exhaust introducing path 10, 12, 14, 16, opening to each intake branch pipe 6a, 6b, 6c, 6d, projects into the intake branch pipe 6a, 6b, 6c, 6d. The configuration allows the exhaust air to be uniformly diffused in the intake air. In addition, it is the curved wall surface 10b, 12b, 14b, 16b to project into the intake branch pipe 6a, 6b, 6c, 6d. Thus, even though the end of each exhaust introducing path 10, 12, 14, 16, is exposed to the intake airflow, the resistance against the intake airflow is restrained as the non-squared portion projects into the intake branch pipe 6a, 6b, 6c, 6d. Hence, the pumping loss of the internal combustion engine is reduced.

In particular, the end surface 10c, 12c, 14c, 16c of the exhaust introducing path 10, 12, 14, 16 is formed in a manner that the curved wall surface 10b, 12b, 14b, 16b side of the end surface 10c, 12c, 14c, 16c inclines in the direction opposite to the intake airflow direction to the connecting end surface 20 of each intake branch tube 6a, 6b, 6c, 6d. Practically, the curved wall surface 10b, 12b, 14b, 16b side inclines in the direction opposite to the intake airflow direction relative to the intake airflow intersecting position. Further, the curved wall surface 10b, 12b, 14b, 16b side inclines (at 45 to 55 degrees) in the direction opposite to the intake airflow direction relative to the exhaust introducing path intersecting position. The configuration allows the exhaust air to be uniformly distributed to the intake air of each cylinder and to be uniformly diffused. In addition, the resistance against the intake air is restrained with the configuration.

(4) In case that an Atkinson-cycle engine is used as the internal combustion engine to which the intake manifold 2 is applied, the intake air which has been sucked is blown back from a combustion chamber to an intake path side. Thus, the deposits in the combustion chamber are carried by the blow-back air to collide with each end surface 10c, 12c, 14c, 16c of the exhaust introducing path 10, 12, 14, 16, and the deposit adherence is more likely to be induced.

However, in the first embodiment, the curved wall surface 10b, 12b, 14b, 16b side of the end surface 10c, 12c, 14c, 16c of the exhaust introducing path 10, 12, 14, 16 inclines in the direction opposite to the intake airflow direction. In this configuration, the end surface 10c, 12c, 14c, 16c is less subject to the blow-back air, or the blow-back air is not easily drawn to the exhaust introducing path 10, 12, 14, 16. Thus, the prevention of the deposit adherence is sufficiently achieved.

Second Embodiment 2

FIGS. 6a, 6b, 6c and 6d are longitudinal cross sections of the exhaust introducing path according to a second embodiment. Configurations of the exhaust introducing path, other than those shown in these figures, are similar to that of the first embodiment.

Figure 6A:
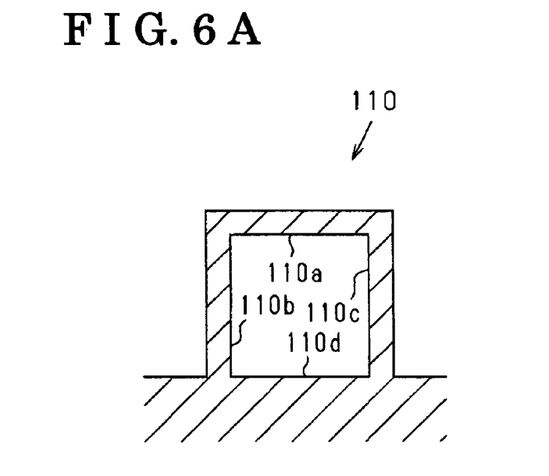
FIG. 6A, 6B, 6C, 6D are cross sectional views of an exhaust introducing path in the intake manifold according to a second embodiment.

In an inner peripheral surface of an exhaust introducing path 110 shown in FIG. 6A, unlike the first embodiment, a configuration made of the curved wall surface and the bottom surface does not exist. The inner peripheral surface of the exhaust introducing path 110 has a rectangular shaped cross section, which is made of a ceiling 110a, side surfaces 110b and 110c, and a bottom surface 110d. The cross section may be formed in a trapezoid in which width of the ceiling 110a is narrower than that of the bottom surface 110d. Adversely, the trapezoid may be formed in a manner that the width of the bottom surface 110d may be narrower than the ceiling 110a. Further, the side surfaces 110b and 110c do not have to have an identical height.

Figure 6B:
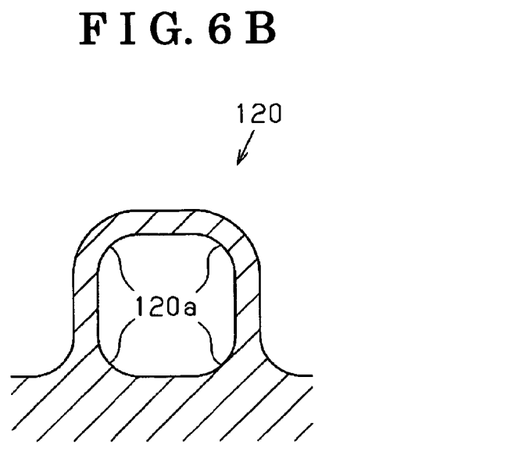

An inner peripheral surface of an exhaust introducing path 120, shown in FIG. 6B, has substantially a rectangular cross section and corners of a square 120a are rounded. The configuration of the exhaust introducing path 120 is similar to that of FIG. 6A except for the foregoing features.

Figure 6C:
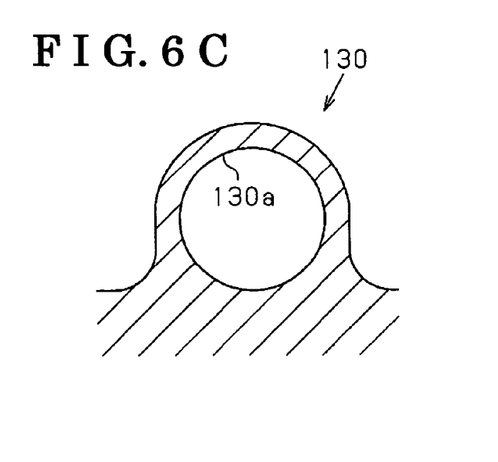
Figure 6D:
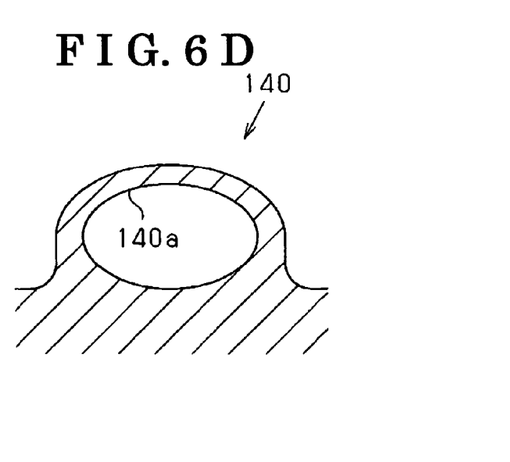

An inner peripheral surface 130a of an exhaust introducing path 130, shown in FIG. 6c, has a circular cross section. Meanwhile, as with an inner peripheral surface 140a of an exhaust introducing path 140 shown in FIG. 6D, the inner peripheral surface may be formed in a horizontal ellipse. Further, the inner peripheral surface may be formed in a vertical ellipse.

Figure 7:
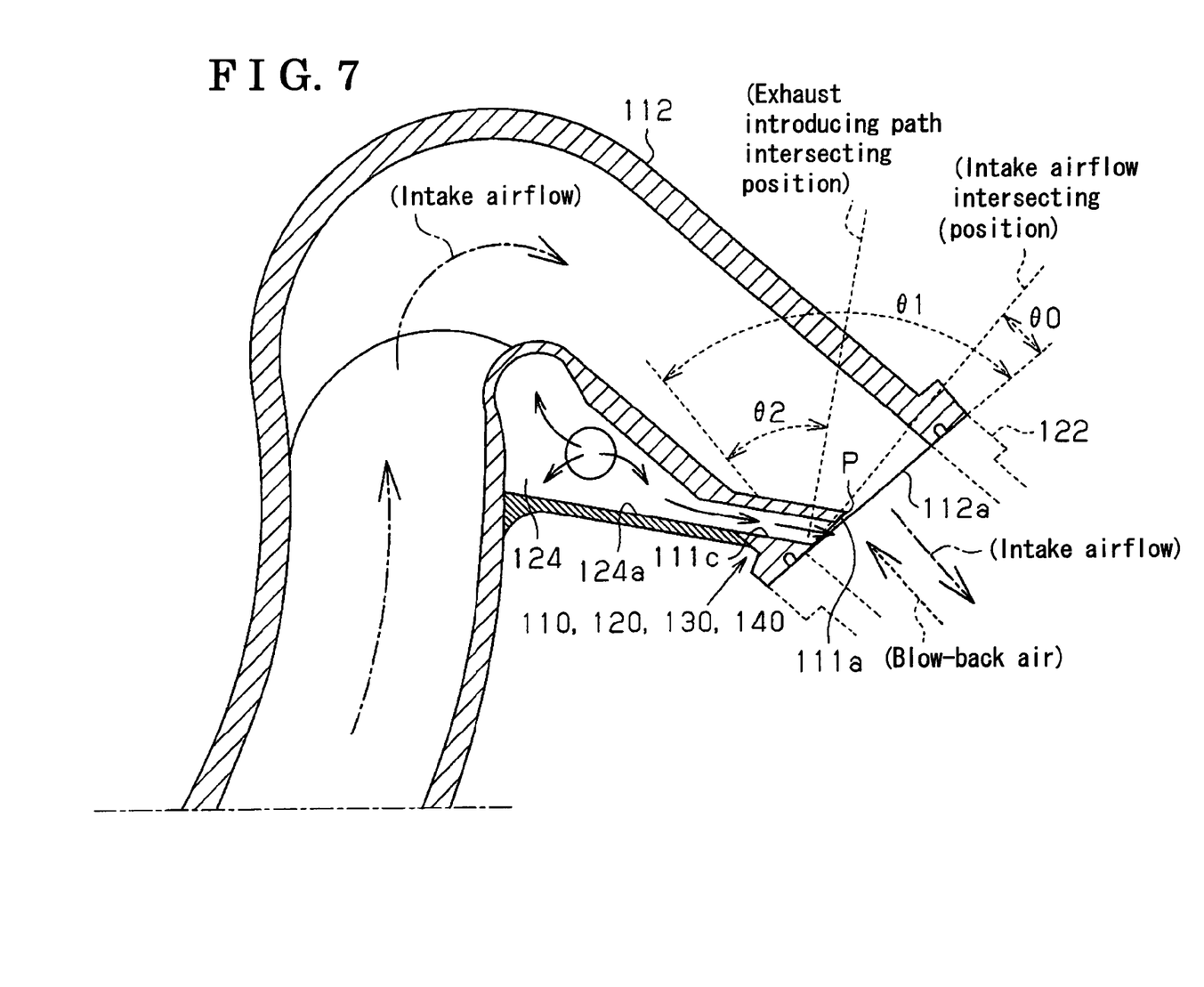
FIG. 7 is a cross sectional view of the intake manifold according to the second embodiment, corresponding to FIG. 4.

A configuration of any one of the above-described exhaust introducing paths 110, 120, 130, and 140 and the modifications of the foregoing exhaust introducing paths will be applied to the exhaust introducing path in the second embodiment. As shown in FIG. 7, an intake path center side P (a side of the end surface 111a which is closer to a center of the intake path) of each exhaust introducing path 110, 120, 130, 140, having one of the above-described shapes, inclines in the direction opposite to the intake flow direction relative to a connecting end portion 112a of the intake branch pipe 112 which connects with a metal-made intake port 122. In an example shown in FIG. 7, the end surface 111a inclines in the direction opposite to the intake flow direction relative to the connecting end surface 112a to be placed between the intake airflow intersecting position and a position of the connecting end surface 112a. The inclination in FIG. 7 shows the geometry of the end surface 111a and the connecting end surface 112a. Practically, the end surface 111a is positioned closer to the intake flow intersecting position than the figure. Thus, when viewed from the intake airflow direction, the end surface 111a raises relative to the connecting end surface 112a.

Figure 8A:
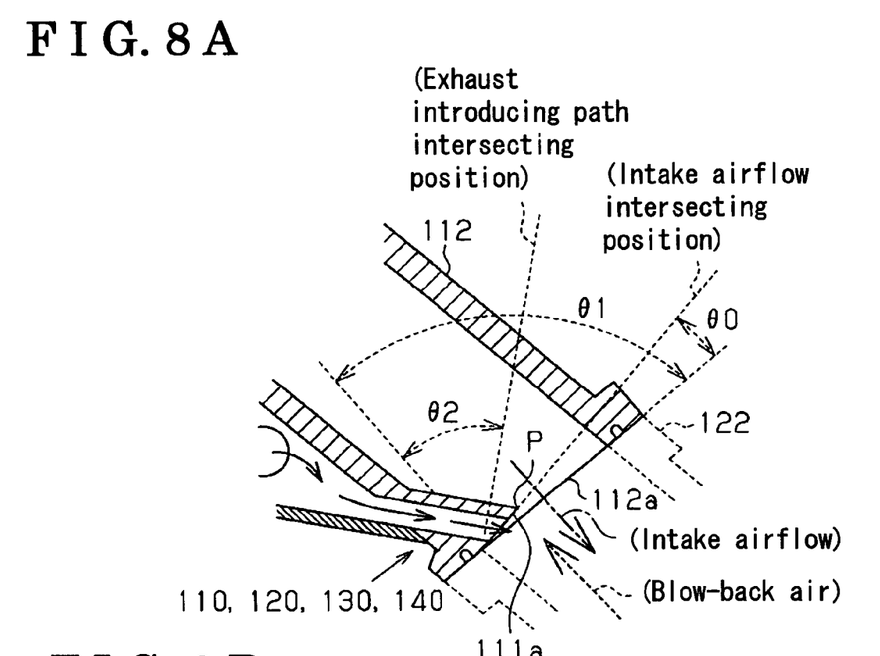
FIGS. 8A and 8B are cross sectional views showing incline positions of an end surface of the exhaust introducing path in the intake manifold according to the second embodiment.
Figure 8B:
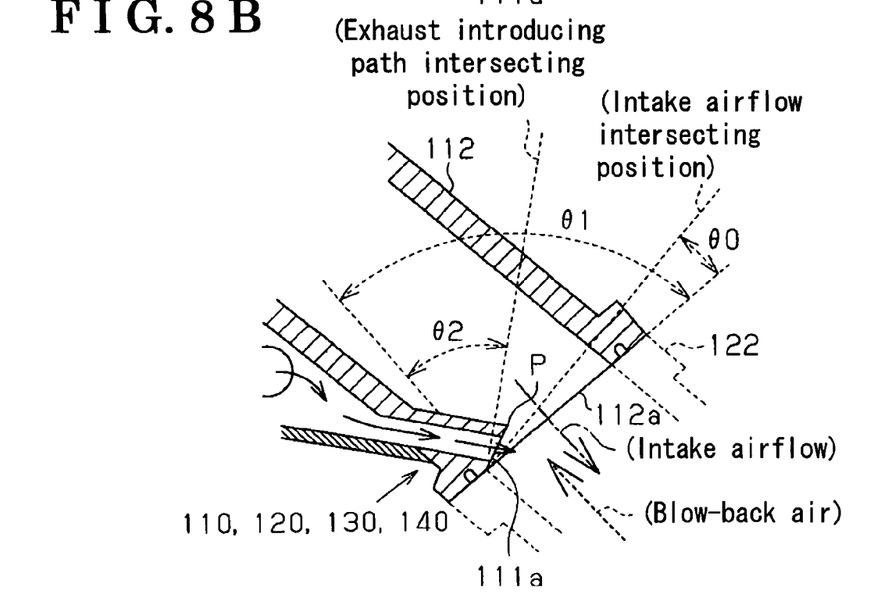

Other than the inclining position of the end surface 111a shown in FIG. 7, the end surface 111a may incline so as to be placed at substantially the same position (including the same position) as the intake flow intersecting position as shown in FIG. 8A. Further, as shown in FIG. 8B, the end surface 111a may be placed at a position between the intake flow intersecting position and the exhaust introducing path intersecting position of the exhaust introducing path 110, 120, 130, 140 by being further inclined in the direction opposite to the intake airflow direction.

Figure 9A:
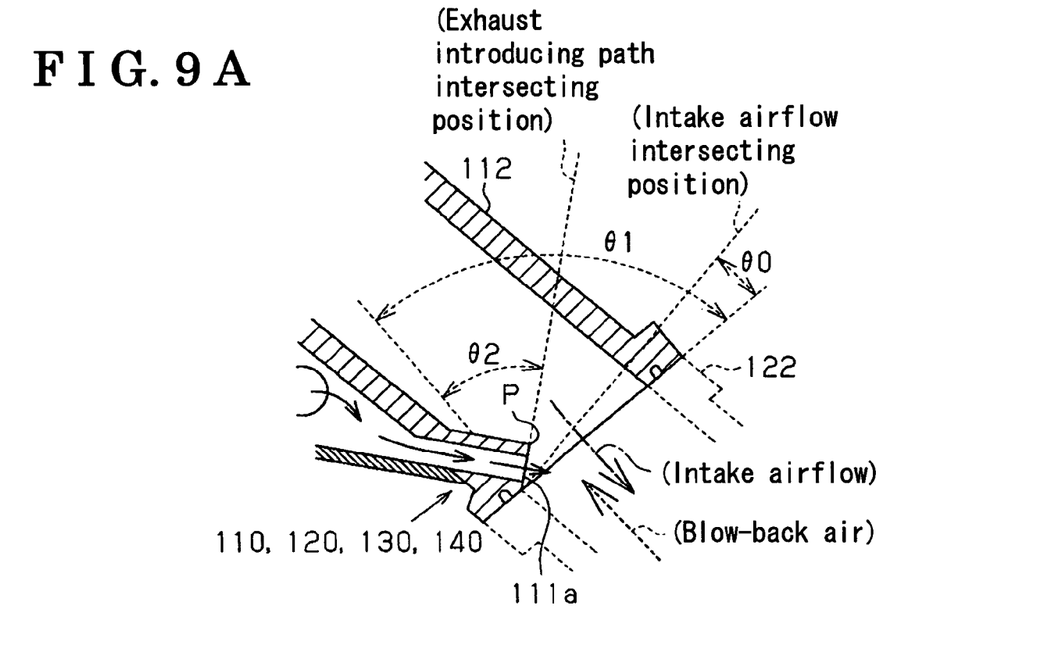
FIGS. 9A and 9B are diagrams, each showing a modification of configurations shown in FIGS. 8A and 8B.
Figure 9B:
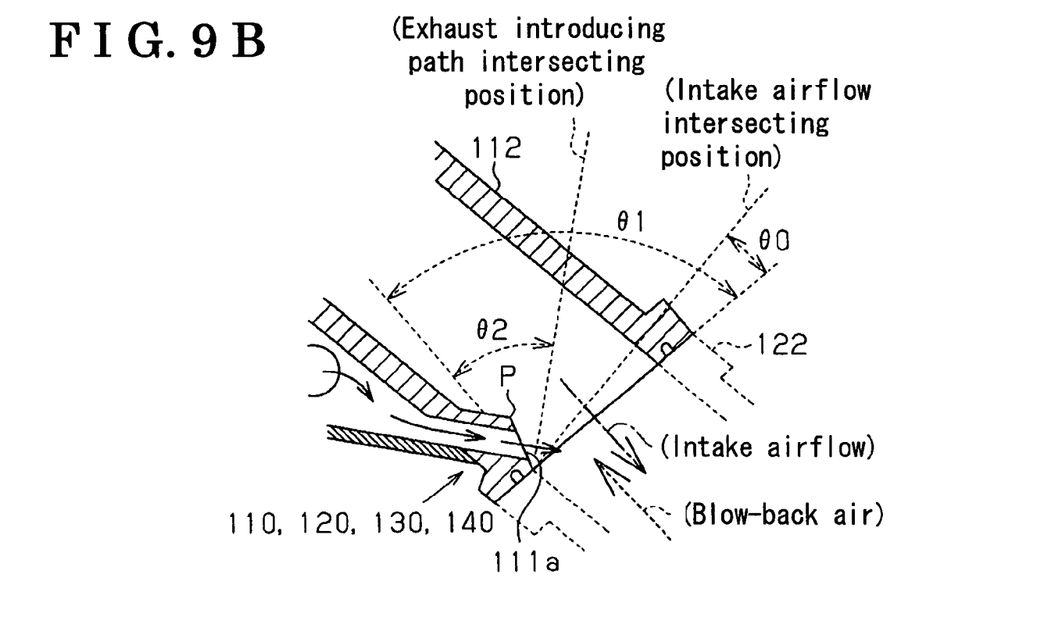

Furthermore, as shown in FIG. 9A, the end surface 111a may be placed at substantially the same position as the exhaust introducing path intersecting position of each exhaust introducing path 110, 120, 130, 140 by being further inclined in the direction opposite to the intake airflow direction. Still further, as shown in FIG. 9B, the end surface 111a may be placed between the exhaust introducing path intersecting position of each exhaust introducing path 110, 120, 130, 140 and the position of the end surface 12c shown in FIG. 4 of the first embodiment by being further inclined in the direction opposite to the intake airflow direction. Furthermore, the end surface 111a may be further inclined in the direction opposite to the intake airflow direction to be placed at the position of the end surface 12c shown in FIG. 4 of the first embodiment.

According to the second embodiment described above, the following effects are achieved.

(1) Generally, when integrally molding the intake branch pipe 112 by injection molding using resin, the exhaust introducing path forms a straight line due to the form of the mold. Moreover, it is also general that the end surface is formed at the same position as the connecting end surface 112a. However, the end surface of the exhaust introducing path significantly raises and projects into the intake branch pipe 112 in the configuration. Thus, flow resistance of the intake airflow is increased. In addition, when an Atkinson-cycle engine is used, the amount of the deposit adherence becomes larger due to the blow-back air described above.

However, as shown in FIG. 7 of the second embodiment, when the end surface 111a inclines in the direction opposite to the intake airflow, even if the inclination is subtle, the raised portion of the end surface 111a of each exhaust introducing path 110, 120, 130, 140 is reduced in the intake branch pipe 112. As shown in FIGS. 8A, 8B, 9A and 9B, the larger the inclination of the end surface 111a in the direction opposite to the intake airflow direction becomes, the smaller the raised portion of the end surface 111a in the intake branch pipe 112 becomes. Consequently, the exhaust air is uniformly distributed to each cylinder and uniformly diffused. Additionally, the resistance against the intake airflow is restrained. Further, in case that the blow-back air occurs, the deposit adherence is prevented.

When the end surface 111a projects into the intake branch pipe 112, not positioned in parallel with the intake airflow, even though the projection is subtle, the imbalance of the exhaust supply to the intake airflow is restrained. Hence, the exhaust is uniformly mixed with the intake air.

(2) Each exhaust introducing path 110, 120, 130, 140 is formed in a straight line and is disposed in the inclined state that the exhaust flows downwardly. Thus, the configuration facilitates the flow of the condensed water in the exhaust flow direction, improving the efficiency of discharge of the condensed water into the intake air.

Further, as shown in FIG. 7, a bottom surface 111c of each exhaust introducing path 110, 120 is formed continuously from a bottom surface 124a of an EGR chamber 124 in the same plane. Consequently, the condensed water does not accumulate between the EGR chamber 124 and each exhaust introducing path 110, 120 and flows out smoothly toward the intake branch pipe 112.

Further, a lowest portion of the inner peripheral surface 130a, 140a of each exhaust introducing path 130, 140 is formed continuously from the bottom surface 124a of the EGR chamber 124 in the same plane. Consequently, the condensed water does not accumulate in the exhaust introducing path 130, 140 and flows out smoothly toward the intake branch pipe 112.

Third Embodiment

In a third embodiment, an example of the configuration of a connecting portion, in which the exhaust supply portion 8b (connecting portion) shown in FIGS. 2 and 4 connects with the exhaust supply pipe (gas supply pipe), will be described. Other configurations are similar to those of the first and second embodiments.

Figure 10:
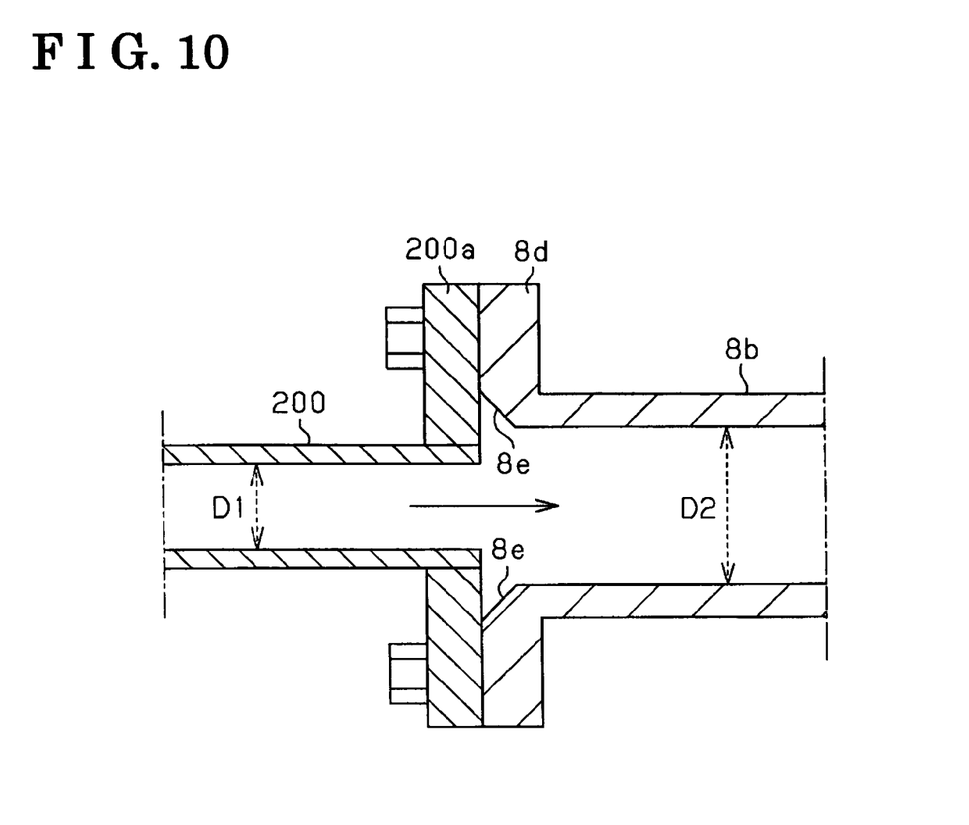
FIG. 10 is a diagram showing a connecting state between an exhaust supply pipe of an EGR system and the intake manifold according to the first embodiment.

As shown in FIG. 10, the intake manifold incorporated into the internal combustion engine is connected with the exhaust supply pipe 200 of the EGR system. Specifically, a flange 200a of the exhaust supply pipe 200 is fastened with a flange 8d of the exhaust supply portion 8b with bolts.

However, an inner diameter D1 of the exhaust supply pipe 200 is smaller than an inner diameter D2 of the exhaust supply portion 8b. Further, an inner peripheral portion 8e of the flange 8d is chamfered.

According to the third embodiment described above, the following effects are achieved.

(1) The inner diameter D2 of the exhaust supply portion 8b is larger than the inner diameter D1 of the exhaust supply pipe 200. The configuration hinders the high temperature exhaust air from hitting the exhaust supply portion 8b directly when the high temperature exhaust air, which is not sufficiently cooled down, is supplied from the exhaust supply pipe 200. Since the exhaust supply portion 8b is not subject to the high temperature exhaust air directly, deterioration of strength is assuredly prevented in the exhaust supply portion 8b.

(2) In the exhaust supply portion 8b, the inner peripheral portion 8e of a contact portion of the flange 8d, which connects with the exhaust supply pipe 200, is chamfered. Hence, even if the connecting position, which connects with the flange 200a of the exhaust supply pipe 200, is slightly misaligned in a direction that intersects an axis of the exhaust supply pipe 200 at the right angle, an end portion of the exhaust supply portion 8b is prevented from being subject to the high temperature exhaust air. Therefore, the deterioration of the strength is assuredly prevented in the exhaust supply portion 8b, in particular, in the flange 8d.

(3) Other effects obtained in the third embodiment are similar those described in the first and second embodiments.

Other Embodiments (a) In each embodiment, the gas introducing path is used for introducing the exhaust air into the intake air. However, the gas introducing path may be used for introducing gases other than the exhaust air. For example, the gas introducing path may be used for introducing a blow-by gas of the internal combustion engine or the fuel vapor derived from the fuel vaporization from a fuel tank (a purge gas from a canister and the like) into the intake air. Alternatively, a combination of multiple gases chosen from the exhaust air, the blow-by gas, and the fuel vapor, may be introduced into the intake air. Even if one of these gases is introduced and the condensed water or other condensed liquid occurs, the liquid is smoothly discharged. Further, the gas is uniformly distributed to each cylinder and is uniformly diffused. Furthermore, in the gas introducing structure, the lower resistance against the intake airflow is restrained the gas introducing path. Thus, the gas is introduced into the intake air smoothly.

(b) The inclining state of the end surface 111a according to the second embodiment (FIGS. 7 to 9) may be applied to the inclining state of the end surface 12c (FIG. 4) according to the first embodiment. As a result, the effects described in the second embodiment are achieved.

(c) In the second embodiment, each exhaust introducing path 110, 120, 130, 140 is introduced into the intake branch pipe 112 from the lower side. However, if a space, for forming the exhaust introducing path 110, 120, 130, 140, is available, the exhaust introducing path 110, 120, 130, 140 may be introduced into the intake branch pipe 112 from the side or from above. The effects described in the second embodiment are achieved by inclining the intake path center side P in the direction opposite to the intake airflow direction as previously described.

Hereinafter, the configurations for solving the drawbacks and the effects will be described.

A certain angle exists between each end of the bottom surface 10a, 12a, 14a, 16a and the curved wall surface 10b, 12b, 14b, 16b in the exhaust introducing path 10, 12, 14, 16. Thus, each exhaust introducing path 10, 12, 14, 16 is formed with corners C along the direction that the exhaust air flows. When the vapor contained in the exhaust air flowing in the exhaust introducing path 10, 12, 14, 16 is condensed therein, the condensation tends to occur at the corners C or the condensed water W tends to gather at the corners C. Hence, the condensed liquid such as water occurs at the corners C or gathers at the corners C, and then flows along the corners C. When the condensed liquid occurs rapidly and the amount becomes larger than the amount that is able to be flowed along the corners C, the condensed liquid flows out to the bottom surface 10a, 12a, 14a, 16a which is adjacent to the corners C and gathers at the bottom surface 10a, 12a, 14a, 16a, obtaining high fluidity. Thus, the condensed liquid easily moves in the exhaust introducing path 10, 12, 14, 16 to be discharged due to the exhaust airflow in the exhaust introducing path 10, 12, 14, 16 or the inclination of the exhaust introducing path 10, 12, 14, 16.

As just described, the condensed water W or the like flows out along the corners C or the bottom surface 10a, 12a, 14a, 16a without accumulating in the exhaust introducing path 10, 12, 14, 16. Hence, the condensed liquid does not hinder the exhaust air from diffusing uniformly into the intake air or from being distributed uniformly to each cylinder. As a result, the exhaust air is introduced smoothly.

According to the embodiment described above, the straight line intersects the convex curved line at the right angle.

The configuration facilitates the condensation and the concentration of the condensed liquid at the corners C. Further, when a large amount of the condensed liquid occurs rapidly, the configuration allows the condensed liquid to move from the corners C to the bottom surface 10a, 12a, 14a, 16a and to flow along the bottom surface 10a, 12a, 14a, 16a easily. Hence, the condensed water W or the like does not accumulate in the exhaust introducing path 10, 12, 14, 16, enabling smooth exhaust air introduction.

According to the embodiment described above, the exhaust introducing path 10, 12, 14, 16 is disposed in the inclined manner that the exhaust air flows downward. This configuration facilitates the flow of the condensed liquid in the exhaust airflow direction, and the condensed water W or the like flows out into the intake air in the effective manner.

According to the embodiment described above, the exhaust introducing path 10, 12, 14, 16 forms the straight line.

The configuration allows the condensed liquid to be discharged more smoothly.

According to the embodiment described above, the exhaust introducing path 10, 12, 14, 16 introduces the exhaust air from the EGR chamber 8 into the intake port 22 of each cylinder and the bottom surface 8c of the EGR chamber is formed continuously from the bottom surface 10a, 12a, 14a, 16a of the exhaust introducing path 10, 12, 14, 16 in the same plane.

The configuration allows the condensed liquid to flows out smoothly without accumulating between the EGR chamber 8 and the intake port 22 of each cylinder.

According to the embodiment described above, the exhaust introducing path 10, 12, 14, 16 is introduced into the intake path from the lower side, and the curved wall surface 10b, 12b, 14b, 16b side of the end of the exhaust introducing path 10, 12, 14, 16, opening to the intake path, projects into the intake path.

As just described, the curved wall surface 10b, 12b, 14b, 16b of the exhaust introducing path 10, 12, 14, 16 opens in a manner that projects into the intake path, and the exhaust air is diffused uniformly into the intake air due to the configuration. Further, the curved wall surface 10b, 12b, 14b, 16b side projects into the intake branch pipe 6a, 6b, 6c, 6d. Thus, even though the end of the exhaust introducing path 10, 12, 14, 16 is exposed to the intake airflow, the non-squared portion projects into the intake branch pipe 6a, 6b, 6c, 6d. Accordingly, the resistance against the airflow is restrained and the pumping loss of the internal combustion engine is reduced.

According to the embodiment described above, the intake branch pipe 6a, 6b, 6c, 6d of the intake manifold 2 and the intake port 22 formed at the cylinder head of the internal combustion engine are connected with each other at connecting end surfaces 20 to form the intake path. Further, the exhaust introducing path 10, 12, 14, 16 is formed at the intake branch pipe 6a, 6b, 6c, 6d and the end surface 10c, 12c, 14c, 16c of the exhaust introducing path 10, 12, 14, 16 is formed in the same plane as the connecting end surface 20 of the intake branch pipe 6a, 6b, 6c, 6d.

The end of the exhaust introducing path 10, 12, 14, 16, formed at the intake branch pipe 6a, 6b, 6c, 6d of the intake manifold 2, projects into the intake airflow to reach the same plane as the connecting end surface 20 of the intake branch pipe 6a, 6b, 6c, 6d. Thus, the exhaust air is uniformly distributed to each cylinder and is uniformly diffused between the intake branch pipe 6a, 6b, 6c, 6d and the intake port 22.

According to the embodiment described above, the intake branch pipe 6a, 6b, 6c, 6d of the intake manifold 2 and the intake port 22 formed at the cylinder head of the internal combustion engine are connected with each other at the connecting end surfaces 20 to form the intake path. Further, the exhaust introducing path 10, 12, 14, 16 is formed at the intake branch pipe 6a, 6b, 6c, 6d and the end surface 10c, 12c, 14c, 16c of the exhaust introducing path 10, 12, 14, 16 is formed in the manner that the curved wall surface 10b, 12b, 14b, 16b side of the end surface 10c, 12c, 14c, 16c inclines in the direction opposite to the intake airflow relative to the connecting end surface 20 of the intake branch pipe 6a, 6b, 6c, 6d.

As just described, the curved wall surface 10b, 12b, 14b, 16b side of the end surface 10c, 12c, 14c, 16c of each exhaust introducing path 10, 12, 14, 16 inclines in the direction opposite to the intake airflow relative to the connecting end surface 20. Thus, the exhaust air is uniformly distributed to each cylinder and is uniformly diffused. In addition, the resistance against the intake airflow is restrained.

In case that the gas introducing structure is employed in the internal combustion engine, in which the blow-back air is caused from the combustion chamber, such as an Atkinson cycle engine, the end surface 10c, 12c, 14c, 16c is less subject to the blow-back air or the blow-back air is not easily drawn to the exhaust introducing path 10, 12, 14, 16 because the curved wall surface 10b, 12b, 14b, 16b inclines in the direction opposite to the intake airflow. Consequently, the preventive effect for the deposit adherence is achieved.

According to the embodiment described above, the intake branch pipe 6a, 6b, 6c, 6d of the intake manifold 2 and the intake port 22 formed at the cylinder head of the internal combustion engine are connected with each other at the connecting end surfaces 20 to form the intake path. Further, the exhaust introducing path 10, 12, 14, 16 is formed at the intake branch pipe 6a, 6b, 6c, 6d and the end surface 10c, 12c, 14c, 16c of the exhaust introducing path 10, 12, 14, 16 is formed in the manner that the curved wall surface 10b, 12b, 14b, 16b side of the end surface 10c, 12c, 14c, 16c inclines in the direction opposite to the intake airflow relative to the position that intersects the axis of the intake path at the right angle.

As just described, the curved wall surface 10b, 12b, 14b, 16b side of the end surface 10c, 12c, 14c, 16c of the exhaust introducing path 10, 12, 14, 16 inclines in the direction opposite to the intake airflow relative to the connecting end surface 20. Thus, the exhaust air is uniformly distributed to each cylinder and is uniformly diffused. Further, the resistance against the airflow is restrained.

Furthermore, the preventive effect for the deposit adherence is achieved. According to the embodiment described above, the end surface 10c, 12c, 14c, 16c of the exhaust introducing path 10, 12, 14, 16 is formed at the position that intersects the axis of the exhaust introducing path 10, 12, 14, 16 at the right angle.

As just described, the end surface 10c, 12c, 14c, 16c of the exhaust introducing path 10, 12, 14, 16 projects into the intake airflow to reach the position that intersects the exhaust introducing path 10, 12, 14, 16 at the right angle. Thus, the exhaust air is uniformly distributed to each cylinder and is uniformly diffused.

The curved wall surface 10b, 12b, 14b, 16b side of the end surface 10c, 12c, 14c, 16c of the exhaust introducing path 10, 12, 14, 16 inclines in the direction opposite to the intake airflow direction. Thus, the preventive effect for the deposit adherence caused by the blow-back air is achieved.

According to the embodiment described above, the end surface 10c, 12c, 14c, 16c of the exhaust introducing path 10, 12, 14, 16 is formed in the manner that the curved wall surface 10b, 12b, 14b, 16b side of the end surface 10c, 12c, 14c, 16c inclines in the direction opposite to the intake airflow relative to the position that intersects the axis of the exhaust introducing path 10, 12, 14, 16 at the right angle.

As just described, the curved wall surface 10b, 12b, 14b, 16b side of the end surface 10c, 12c, 14c, 16c of the exhaust introducing path 10, 12, 14, 16 inclines in the direction opposite to the intake airflow direction relative to the position that intersects the axis of the exhaust introducing path 10, 12, 14, 16 at the right angle. Thus, the exhaust air is uniformly distributed to each cylinder and is uniformly diffused. Further, the resistance against the airflow is further restrained.

In addition, the curved wall surface 10b, 12b, 14b, 16b side of the end surface 10c, 12c, 14c, 16c of the exhaust introducing path 10, 12, 14, 16 further inclines in the direction opposite to the intake airflow direction. Hence, the preventive effect for the deposit adherence caused by the blow-back air is enhanced.

Specifically, the curved wall surface 10b, 12b, 14b, 16b side of the end surface 10c, 12c, 14c, 16c of the exhaust introducing path 10, 12, 14, 16 inclines at 45 to 55 degrees in the direction opposite to the intake airflow direction relative to the position that intersects the axis of the exhaust introducing path 10, 12, 14, 16 at the right angle.

Thus, the exhaust air is uniformly distributed to each cylinder and is uniformly diffused. Further, the resistance against the airflow is further restrained, and the preventive effect for the deposit adherence caused by the blow-back air is sufficiently enhanced.

As described above, the end of the exhaust introducing path 110, 120, 130, 140 opens in the manner that projects into the intake path in the intake branch pipe 112, and the exhaust air is uniformly distributed to each cylinder and is diffused uniformly into the intake air.

Further, the intake path center side P of the end surface 111a inclines in the direction opposite to the intake airflow direction relative to the connecting end surfaces 112a of the intake branch pipe 112 and the intake port 122. Thus, the resistance against the airflow is further restrained and the pumping loss of the internal combustion is reduced.

In case that the gas introducing structure is employed in the internal combustion engine, in which the blow-back air is caused from the combustion chamber, such as an Atkinson cycle engine, the end surface 111a is less subject to the blow-back air or the blow-back air is not easily drawn to the exhaust introducing path 110, 120, 130, 140 because the intake path center side P inclines in the direction opposite to the intake airflow. Consequently, the preventive effect for the deposit adherence is achieved.

According to the embodiment described above, the exhaust introducing path 110, 120, 130, 140 is formed in the direction that intersects the intake airflow direction of the intake path at the acute angle.

Thus, even though the end of the exhaust introducing path 110, 120, 130, 140 projects into the intake path, the resistance against the intake airflow becomes smaller.

According to the embodiment described above, the exhaust introducing path 110, 120, 130, 140 is disposed in the inclined manner that the exhaust air flows downward. The exhaust introducing path 110, 120, 130, 140 inclines as described above. Even though water or the like is condensed in the exhaust introducing path 110, 120, 130, 140, the inclination facilitates the flow of the condensed liquid in the exhaust air flow direction and the condensed water or the like is appropriately discharged into the intake air.

According to the embodiment described above, the end surface 111a of the exhaust introducing path 110, 120, 130, 140 is formed in the manner that the intake path center side P of the end surface 111a inclines in the direction opposite to the intake airflow relative to the position that intersects the axis of the intake path at the right angle.

As just described, the intake path center side P of the end surface 111a of the exhaust introducing path 110, 120, 130, 140 inclines in the direction opposite to the intake airflow relative to the position that intersects the axis of the intake airflow at the right angle. Thus, the exhaust air is uniformly distributed to each cylinder and is uniformly diffused. Further, the resistance against the airflow is restrained.

Furthermore, the preventive effect for the deposit adherence is achieved. According to the embodiment described above, the end surface 111a of the exhaust introducing path 110, 120, 130, 140 is formed at the position that intersects the axis of the exhaust introducing path 110, 120, 130, 140 at the right angle.

Thus, the exhaust air is uniformly distributed to each cylinder and is uniformly diffused.

The intake path center side P further inclines in the direction opposite to the intake airflow direction. Hence, the preventive effect for the deposit adherence caused by the blow-back air is enhanced. According to the embodiment described above, the end surface 111a of the exhaust introducing path 110, 120, 130, 140 is formed in the manner that the intake path center side P of the end surface 111a inclines in the direction opposite to the intake airflow relative to the position that intersects the axis of the exhaust introducing path 110, 120, 130, 140 at the right angle.

As just described, the intake path center side P of the end surface 111a of the exhaust introducing path 110, 120, 130, 140 is not placed at the position that intersects the axis of the exhaust introducing path 110, 120, 130, 140 at the right angle. The intake path center side P further inclines in the direction opposite to the intake airflow relative to the position that intersects the axis of the exhaust introducing path 110, 120, 130, 140 at the right angle. Thus, the exhaust air is uniformly distributed to each cylinder and is uniformly diffused. Further, the resistance against the airflow is further restrained.

Further, the intake path center side P significantly inclines in the direction opposite to the intake airflow direction. Hence, the preventive effect for the deposit adherence caused by the blow-back air is enhanced.

Specifically, the intake path center side P of the end surface 111a of the exhaust introducing path 110, 120, 130, 140 inclines at 45 to 55 degrees in the direction opposite to the intake airflow direction relative to the position that intersects the axis of the exhaust introducing path 110, 120, 130, 140 at the right angle.

Thus, the exhaust air is uniformly distributed to each cylinder and is uniformly diffused. Further, the resistance against the airflow is further restrained and the preventive effect for the deposit adherence caused by the blow-back air is sufficiently enhanced.

According to the embodiment described above, the gas introducing structure of the intake path includes the exhaust supply portion 8b made of resin and the exhaust supply portion 8b connects with the exhaust supply pipe 200 made of metal for receiving gas supply. The exhaust supply portion 8b has the diameter D2 that is larger than the diameter D1 of the exhaust supply pipe 200.

The exhaust supply portion 8b has the diameter D2 larger than that of the exhaust supply pipe 200. When the high temperature exhaust air is supplied from the exhaust supply pipe 200, the configuration hinders the high temperature exhaust air from hitting the exhaust supply portion 8b directly. Since the exhaust supply portion 8b is not subject to the high temperature exhaust air directly, deterioration of strength is assuredly prevented in the exhaust supply portion 8b.

According to the embodiment described above, the inner peripheral surface 8e of the exhaust supply portion 8b, which is in contact with the exhaust supply pipe 200, is chamfered.

Hence, even if the position, which connects the exhaust supply pipe 200, is slightly misaligned in the direction that intersects the axis of the exhaust supply pipe 200 at the right angle, the configuration prevents the end portion of the exhaust supply portion 8b from being subject to the high temperature exhaust air. Therefore, the deterioration of the strength is assuredly prevented in the exhaust supply portion 8b.

The principles, of the preferred embodiments and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A gas introducing structure of an intake path of an internal combustion engine having a plurality of cylinders, the gas introducing system comprising:
 a common chamber;
 a gas introducing path introducing the gas from the common gas chamber into an intake port of each cylinder,
 wherein an inner peripheral surface of the gas introducing path includes:
  a bottom surface appearing as a straight line at a lower side of a perpendicular cross section of the inner peripheral surface; and
  a curved wall surface appearing as a convex curved line, connecting with each end of the straight line at an angle, at an upper side of the perpendicular cross section of the inner peripheral surface.

2. A gas introducing structure of an intake path according to claim 1, wherein the straight line intersects the convex curved line at a right angle.

3. A gas introducing structure of an intake path according to claim 1, wherein the gas introducing path is disposed in an inclined manner that the gas flows downward.

4. A gas introducing structure of an intake path according to claim 1, wherein the gas introducing path forms a straight line.

5. A gas introducing structure of an intake path according to claim 1, wherein a bottom surface of the common gas chamber is formed continuously from the bottom surface of the gas introducing path in a same plane.

6. A gas introducing structure of an intake path according to claim 1, further comprising:
 a connecting portion made of resin,
 wherein the connecting portion connects with a gas supply pipe made of metal for receiving gas supply, and the connecting portion has a diameter that is larger than a diameter of the gas supply pipe.

7. A gas introducing structure of an intake path according to claim 6, wherein an inner peripheral surface of the connecting portion, which is in contact with the gas supply pipe, is chamfered.

8. A gas introducing structure of an intake path of an internal combustion engine having a plurality of cylinders, the gas introducing system comprising:
 a common chamber;
 a gas introducing path introducing the gas from the common gas chamber into an intake port of each cylinder,
 wherein an inner peripheral surface of the gas introducing path includes:

a bottom surface appearing as a straight line at a lower side of a perpendicular cross section of the inner peripheral surface; and a curved wall surface appearing as a convex curved line, connecting with each end of the straight line at an angle, at an upper side of the perpendicular cross section of the inner peripheral surface, wherein the gas introducing path is introduced into the intake path from a lower side, and a curved wall surface side of an end of the gas introducing path, opening to the intake path, projects into the intake path.

9. A gas introducing structure of an intake path according to claim 8, wherein an intake branch pipe of an intake manifold and an intake port formed at a cylinder head of the internal combustion engine are connected with each other at connecting end surfaces to form the intake path, wherein the gas introducing path is formed at the intake branch pipe and an end surface of the gas introducing path is formed in a same plane as the connecting end surface of the intake branch pipe.

10. A gas introducing structure of an intake path according to claim 8, wherein an intake branch pipe of an intake manifold and an intake port formed at a cylinder head of the internal combustion engine are connected with each other at connecting end surfaces to form the intake path, wherein the gas introducing path is formed at the intake branch pipe and an end surface of the gas introducing path is formed in a manner that the curved wall surface side of the end surface inclines in a direction opposite to the intake airflow relative to the connecting end surface of the intake branch pipe.

11. A gas introducing structure of an intake path according to claim 8, wherein an intake branch pipe of an intake manifold and an intake port formed at a cylinder head of the internal combustion engine are connected with each other at connecting end surfaces to form the intake path, wherein the gas introducing path is formed at the intake branch pipe and an end surface of the gas introducing path is formed in a manner that the curved wall surface side of the end surface inclines in a direction opposite to the intake airflow relative to a position that intersects an axis of the intake path at a right angle.

12. A gas introducing structure of an intake path according to claim 11, wherein the end surface of the gas introducing path is formed at a position that intersects an axis of the gas introducing path at the right angle.

13. A gas introducing structure of an intake path according to claim 11, wherein the end surface of the gas introducing path is formed in a manner that the curved wall surface side of the end surface inclines in the direction opposite to the intake airflow relative to a position that intersects an axis of the gas introducing path at the right angle.

14. A gas introducing structure of an intake path comprising:

a gas introducing path introducing a gas to an intake airflow in the intake path of an internal combustion engine, wherein an intake branch pipe of an intake manifold and an intake port formed at a cylinder head of the internal combustion engine are connected with each other at connecting end surfaces to form the intake path, wherein the gas introducing path is introduced into the intake pipe from a lower side and a curved wall surface side of an end of the gas introducing path, opening to the intake path, projects into the intake path and an end surface of the gas introducing path is formed in a manner that an intake path center side of the end surface inclines in a direction opposite to the intake airflow relative to the connecting end surface of the intake branch pipe.

15. A gas introducing structure of an intake path according to claim 14, wherein the gas introducing path is formed in a direction that intersects an intake airflow direction of the intake path at an acute angle.

16. A gas introducing structure of an intake path according to claim 14, wherein the gas introducing path is disposed in an inclined manner that the gas flows downward.

17. A gas introducing structure of an intake path according to claim 15, wherein the end surface of the gas introducing path is formed in a manner that the intake path center side of the end surface inclines in the direction opposite to the intake airflow relative to a position that intersects an axis of the intake path at a right angle.

18. A gas introducing structure of an intake path according to claim 17, wherein the end surface of the gas introducing path is formed at a position that intersects an axis of the gas introducing path at the right angle.

19. A gas introducing structure of an intake path according to claim 17, wherein the end surface of the gas introducing path is formed in a manner that the intake path center side of the end surface inclines in the direction opposite to the intake airflow relative to a position that intersects an axis of the gas introducing path at the right angle.

* * * * *